(12) United States Patent
Aubriat et al.

(10) Patent No.: US 7,225,673 B2
(45) Date of Patent: Jun. 5, 2007

(54) METHOD FOR TESTING THE THERMALLY INDUCED UNBALANCE OF A ROTATING MACHINE PART, IN PARTICULAR THE ROTOR OF A TURBOGENERATOR, AND DEVICE FOR CARRYING OUT THE METHOD

(75) Inventors: Eric Jean Aubriat, Belfort (FR); Ludovic Bregy, Belfort (FR); Andrew John Holmes, Baden (CH); Georg Stephan Klein, Wettingen (CH); Eric Veith, Offemont (FR); Michel Claude Verrier, Essert (FR)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 11/402,710

(22) Filed: Apr. 12, 2006

(65) Prior Publication Data
US 2007/0012092 A1    Jan. 18, 2007

(30) Foreign Application Priority Data
Apr. 13, 2005   (CH)   .................................... 0669/05

(51) Int. Cl.
*G01M 1/16* (2006.01)
(52) U.S. Cl. ...................................................... 73/460
(58) Field of Classification Search .................... 73/66, 73/457, 459, 460, 461, 462, 1.14, 1.84
See application file for complete search history.

(56) References Cited

U.S. PATENT DOCUMENTS 4,060,707 A    11/1977   Olsson et al. ............... 219/121
4,912,834 A *  4/1990   Watanabe et al. .............. 29/598
6,708,563 B2 * 3/2004   Rothamel et al. .............. 73/460
2003/0101813 A1 * 6/2003   Rothamel et al. .............. 73/487
2006/0005623 A1 * 1/2006   Hildebrand et al. .......... 73/468

FOREIGN PATENT DOCUMENTS

EP      0 305 921      3/1989

OTHER PUBLICATIONS

International Search Report for CH 00669/05 (3 pages).

* cited by examiner

*Primary Examiner*—Eric S. McCall
(74) *Attorney, Agent, or Firm*—Darby & Darby

(57) ABSTRACT

In a method for testing the thermally induced unbalance of a rotating machine part, in particular the rotor of a turbogenerator, the rotating machine part or the rotor balanced at normal temperature is brought in the demounted state first to nominal rotational speed and held at this, while its temperature is varied and, at the same time, the transient variations in oscillations of the rotating machine part or rotor which are caused are measured. During the test, the rotating machine part or the rotor is surrounded at least partially by a closed heating cell, a cooling medium flows around and/or flows through the rotating machine part or the rotor in the heating cell, and the heating of the rotating machine part or of the rotor takes place essentially due to the flow-dynamic losses arising from the interaction of the rotating machine part or of the rotor with the circulating cooling medium.

25 Claims, 6 Drawing Sheets

METHOD FOR TESTING THE THERMALLY INDUCED UNBALANCE OF A ROTATING MACHINE PART, IN PARTICULAR THE ROTOR OF A TURBOGENERATOR, AND DEVICE FOR CARRYING OUT THE METHOD

Priority is claimed to Swiss Patent Application No. CH 00669/05, filed on Apr. 13, 2005, the entire disclosure of which is incorporated by reference herein.

The present invention relates to the field of rotating machines. It refers to a method for testing the thermally induced distortion or unbalance of a rotating machine part, according to the preamble of claim 1. It refers, furthermore, to a device for carrying out the method.

BACKGROUND

Rotors of large turbogenerators, before being built into the stator, are normally subjected at the manufacturer's to a test, referred to as "warm-up", which follows the balancing of the rotor in the cold state in the centrifuge. The "warm-up" is intended to simulate the thermally induced unbalances of the rotor which occur during the normal operation of the ready-assembled machine, so that a deviating oscillation behavior can be detected at an early stage and corrected even during production.

A thermally induced warping of the rotor and the oscillations generated as a result of this reversible and reproducible unbalance are based on two critical mechanisms:
the rotor has reached its nominal rotational speed, and the
  rotor winding is held against the centrifugal forces, for
  example by means of wedges.
In this state, an elongation of the rotor winding occurs and
  causes a relative movement between the rotor body and
  the rotor winding.

The forces and mass displacements may, in principle, bring about a variation in the balanced state of the rotor. The measured rotor oscillation will therefore vary. While the turbogenerator is in operation, this variation occurs during an increase in load on a power station and during the reduction in power of the latter and can be tested on the solitary generator rotor in a predetermined "warm-up" test method.

A test method employed at the present time comprises the investigation of the oscillation behavior of a balanced rotor which rotates in a test stand at the nominal rotational speed, while at the same time a predetermined rotor temperature profile is applied. The rise in the mean winding temperature (MWT) is in this case generated as a result of the application of an exciting current, such as will be fed in during the operation of the machine at the installation location. The rotor winding is thereafter cooled, in that the exciting system is switched off and the rotor continues to be operated at nominal rotational speed in the ventilated test stand. This test method, admittedly, is very close to the mechanisms which give rise to thermal unbalance during subsequent operation. However, it requires a considerable outlay in terms of the set-up of the test stand: electromagnetic shields, cooling, an exciting system, sufficient drive power and suitable measuring and monitoring systems.

In another method, the rotor is first balanced in the centrifuge and is then rotated at nominal rotational speed until a predetermined mean winding temperature is reached by virtue of the ventilation losses (flow-dynamic losses which increase the temperature of the cooling medium and consequently of the copper). This method may last through a disproportionately long time during which both the rotor body and the winding heat up. As a result, some important mechanisms of the rotor unbalance are not reproduced, and experience has shown that this leads to disadvantages in terms of the evidential force of such tests.

SUMMARY OF THE INVENTION

An object of the present invention is to provide a method for testing the thermally induced unbalance, in particular of the rotor of a turbogenerator, which avoids the disadvantages of test methods employed hitherto, that is to say achieves the desired test results at a reduced outlay in terms of apparatus, and to provide a device for carrying out the method.

The present invention provides a method for testing a thermally induced unbalance of a rotating machine part. The method includes surrounding the rotating machine part at least partially by at least one closed heating cell, circulating a cooling medium with respect to the rotating machine part in the heating cell, bringing the rotating machine part balanced at normal temperature in a demounted state first to a nominal rotational speed and holding the rotating machine part at the nominal rotational speed, varying the temperature of the rotating machine part, wherein the varying of the temperature takes place essentially due to flow-dynamic losses arising from an interaction of the rotating machine part with the circulating cooling medium, and measuring transient variations in oscillations of the rotating machine part.

The method is characterized in that, during the test, the rotating machine part or the rotor is surrounded at least partially by at least one closed heating cell, in that a cooling medium flows around and/or flows through the rotating machine part or the rotor in the heating cell, and in that the heating of the rotating machine part or of the rotor takes place essentially due to the interaction of the rotating machine part or of the rotor with the circulating cooling medium. Owing to this type of (intrinsic) heating, in particular, complicated electromagnetically acting devices may be dispensed with, without impairments to the evidential force of the results having to be taken into account.

According to one refinement of the invention, the rotating machine part or the rotor 10 to be tested is heated to a higher temperature in a first time interval ($t_0$–$t_1$), is held at the higher temperature in a second time interval ($t_1$–$t_2$) and is cooled from the higher temperature again in a third time interval ($t_2$–$t_3$). The rotating machine part to be tested is, in particular, the rotor of a turbogenerator, the rotor having a rotor winding, and the mean winding temperature being measured in order to determine the temperature of the rotor.

Another refinement is characterized in that the rotor has a rotor shaft and a rotor barrel formed in the middle part of the rotor shaft and containing a rotor winding, in that the rotor barrel is surrounded by the heating cell, and in that the rotor shaft is rotatably mounted on each of the two sides of the rotor barrel in a bearing located outside the heating cell. Preferably, in order to measure the mean winding temperature, the temperature is measured in each case at the ends and in the middle of the rotor barrel.

A further refinement of the invention is distinguished in that the cooling medium enters the heating cell at the ends of the rotor barrel via an inlet line, flows into the rotor winding axially on the end faces of the rotor barrel, flows out of the rotor winding radially on the circumference of the rotor barrel and emerges from the heating cell again via an outlet line. During the heating of the rotor in the first time interval, in this case the cooling medium emerging from the heating cell is recirculated at least partially from the outlet line to the inlet line for renewed entry into the heating cell, so that said cooling medium heats up increasingly as a result of the flow-dynamic interaction with the rotating rotor. By contrast, during the cooling of the rotor in the third time interval, cold cooling medium is supplied to the heating cell and heated cooling medium is discharged.

Another refinement of the invention is characterized in that the heating cell is subdivided inside in the axial direction into one outlet chamber for collecting the cooling medium flowing out of the rotor winding and two inlet chambers which are adjacent at both ends to the outlet chamber and surround the end faces of the rotor barrel, and in that the cooling medium is supplied into the inlet chambers and is discharged from the outlet chamber.

The cooling medium can in this case flow through the rotor winding essentially in the axial direction. It may, however, also flow through the rotor winding essentially in the radial direction. The circulation of the cooling medium through the heating cell or the rotor winding may be controlled in a simple way by means of valves, the profile of the mean winding temperature being influenced during the test by means of the control of the valves.

At least one additional heating source in the cooling media stream may be used in order to regulate the cooling medium temperature. As a result, the method can be accelerated and the transient time correspondingly reduced. Moreover, the temperature gradient between the rotor winding and the rotor barrel can be increased, thus allowing a further approximation of the test conditions to the conditions prevailing during the operation of the rotor.

The circulation of the cooling medium through the heating cell or the rotor winding may also be influenced by means of at least one additional fan.

An embodiment of the device according to the invention is characterized in that it is provided for the rotor of a turbogenerator, said rotor comprising a rotor shaft and a rotor barrel formed in the middle part of the rotor shaft and containing a rotor winding, in that the heating cell surrounds the rotor barrel, and in that bearings for the rotatable mounting of the rotor shaft are arranged on opposite sides outside the heating cell.

The heating cell is preferably subdivided inside in the axial direction into at least one outlet chamber for collecting the cooling medium flowing out of the rotor and at least one inlet chamber which is adjacent to the outlet chamber and surrounds the end face of the rotor barrel or the inlets of the cooling medium into the rotor, inlet lines for the cooling medium being connected to the inlet chamber and outlet lines for the cooling medium being connected to the outlet chamber.

The inlet lines and outlet lines are connected, in particular, by means of a recirculation line which is capable of being shut off and in which a controllable valve is arranged.

Likewise, a controllable valve is arranged in each case upstream and downstream of the recirculation line in the inlet lines and outlet lines. The valves are controlled by a control and evaluation unit according to the temperature measured in the rotor by temperature measurement sensors.

BRIEF DESCRIPTION OF THE DRAWINGS

The present invention will be explained in more detail below by means of exemplary embodiments, in conjunction with the drawing in which.

DETAILED DESCRIPTION

Figure 3:
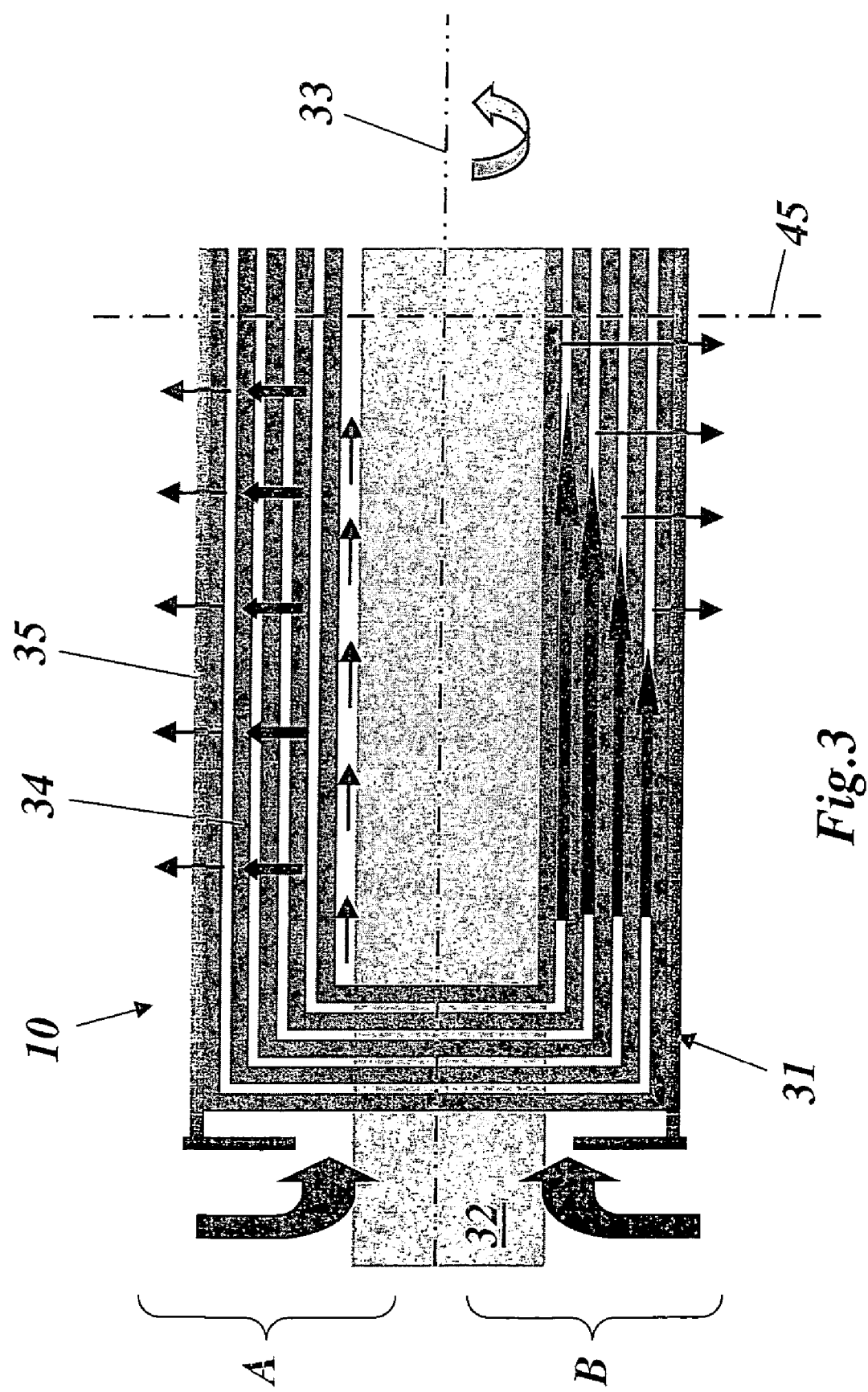
FIG. 3 shows a highly diagrammatic part view of two alternative cooling concepts for the rotor winding of a rotor, to be precise radial cooling (upper half A) and axial cooling (lower half B)
Figure 4:
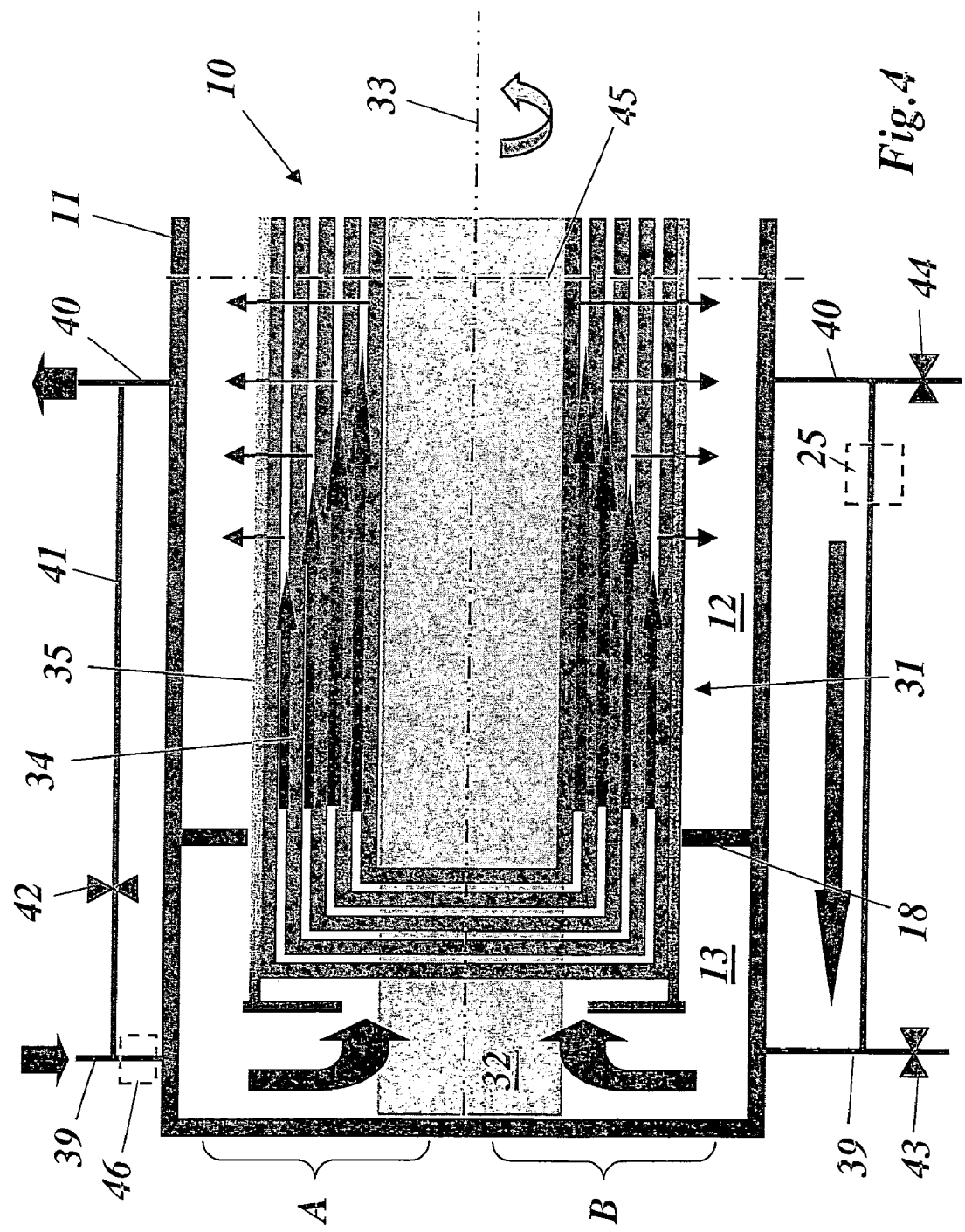
FIG. 4 shows an illustration, comparable to FIG. 3, of the two cases, implementable by means of the heating cell according to FIG. 1, of the heating of the rotor by the closing of the cooling circuit (lower half B) and of the cooling of the rotor with the cooling circuit open (upper half A)

FIG. 4 reproduces a highly diagrammatic part view of an arrangement for testing for thermally induced unbalance of the rotor of a turbogenerator. Only the left half of the rotor 10, which is constructed essentially symmetrically with respect to a midplane 45, is illustrated. The rotor 10 rotatable about a rotor axis 33 has a continuous rotor shaft 32 and a rotor barrel 31 which is formed in the middle of the rotor shaft 32 and in which the rotor winding 34 is laid in axially running grooves and is secured against the effects of centrifugal forces by means of wedges 35 or by comparable means. According to FIGS. 3 and 4, a cooling medium (air or another gas) flows through the rotor barrel 31 or the rotor winding 34, enters in the axial direction in the usual way on the end faces of the rotor barrel 31 and emerges again in the radial direction on the circumference of the rotor barrel 31 (see the flow arrows in FIGS. 3 and 4). According to FIG. 3, cooling may take place radially in a way known per se (upper half A in FIG. 3) or axially (lower half B in FIG. 3). However, mixed forms may also be envisaged.

Figure 1:
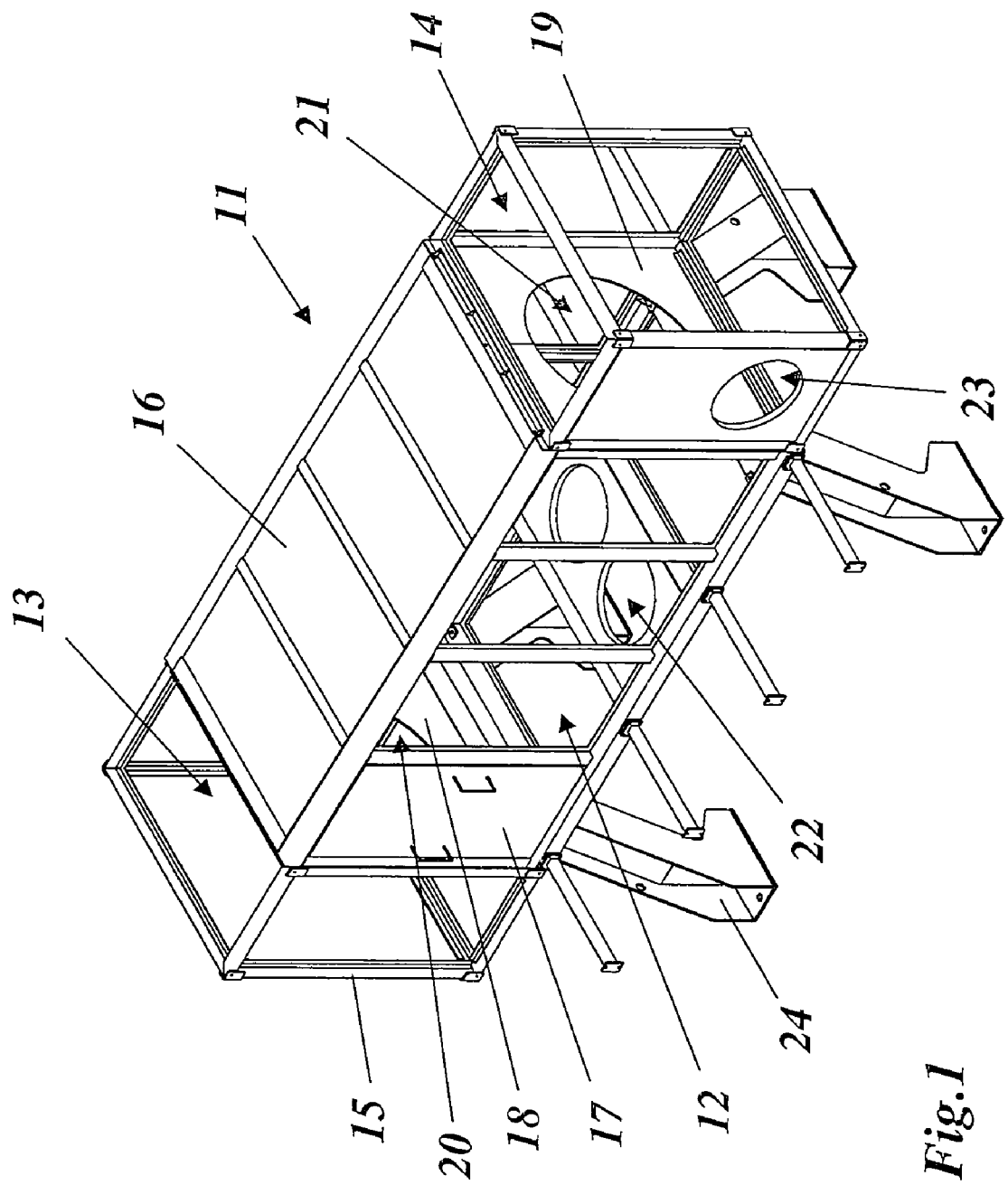
FIG. 1 shows a perspective view of an exemplary embodiment of a heating cell, such as is suitable for testing the rotor of a turbogenerator (the cover elements of the cell, closed all-round per se, are partially removed in order to allow a view into the interior)

According to the invention, then, the cooling medium flowing through the rotor 10 is used to heat the rotor in the controllable and monitored way during the oscillation test, held to the increased temperature and subsequently cooled again. For this purpose, according to FIGS. 2 and 4, the rotor barrel 31 is surrounded by a heating cell 11 which, for the sake of simplicity, is rectangular. FIG. 1 shows an exemplary embodiment of such a heating cell 11. The heating cell 11 shown there consists of a frame 15 made of profile material, which may be completed by cover plates 16 and doors 17 to form a closed housing (in FIG. 1, some of the cover plates 16 and doors 17 are omitted in order to allow a view into the interior of the heating cell 11). The heating cell 11 stands on four stable standing legs 24. The inner space of the heating cell 11 is subdivided into three chambers 12, 13 and 14, to be precise a middle outlet chamber 12, adjacent to which in the axial direction is in each case an inlet chamber 13 and 14 partitioned off by means of a partition 18 and 19, respectively. In the partitions 18, 19, in each case a central circular port 20 and 21 is provided, through which the rotor barrel 31 extends in each case with an end portion. The inlet chambers 13, 14 have laterally arranged inlet ports 23, through which the cooling medium delivered via inlet lines (39 in FIG. 4) enters the heating cell 11. The outlet chamber 12 has, on the bottom, corresponding outlet ports 22, to which outlet lines (40 in FIG. 4) for the cooling medium are connected.

Figure 2:
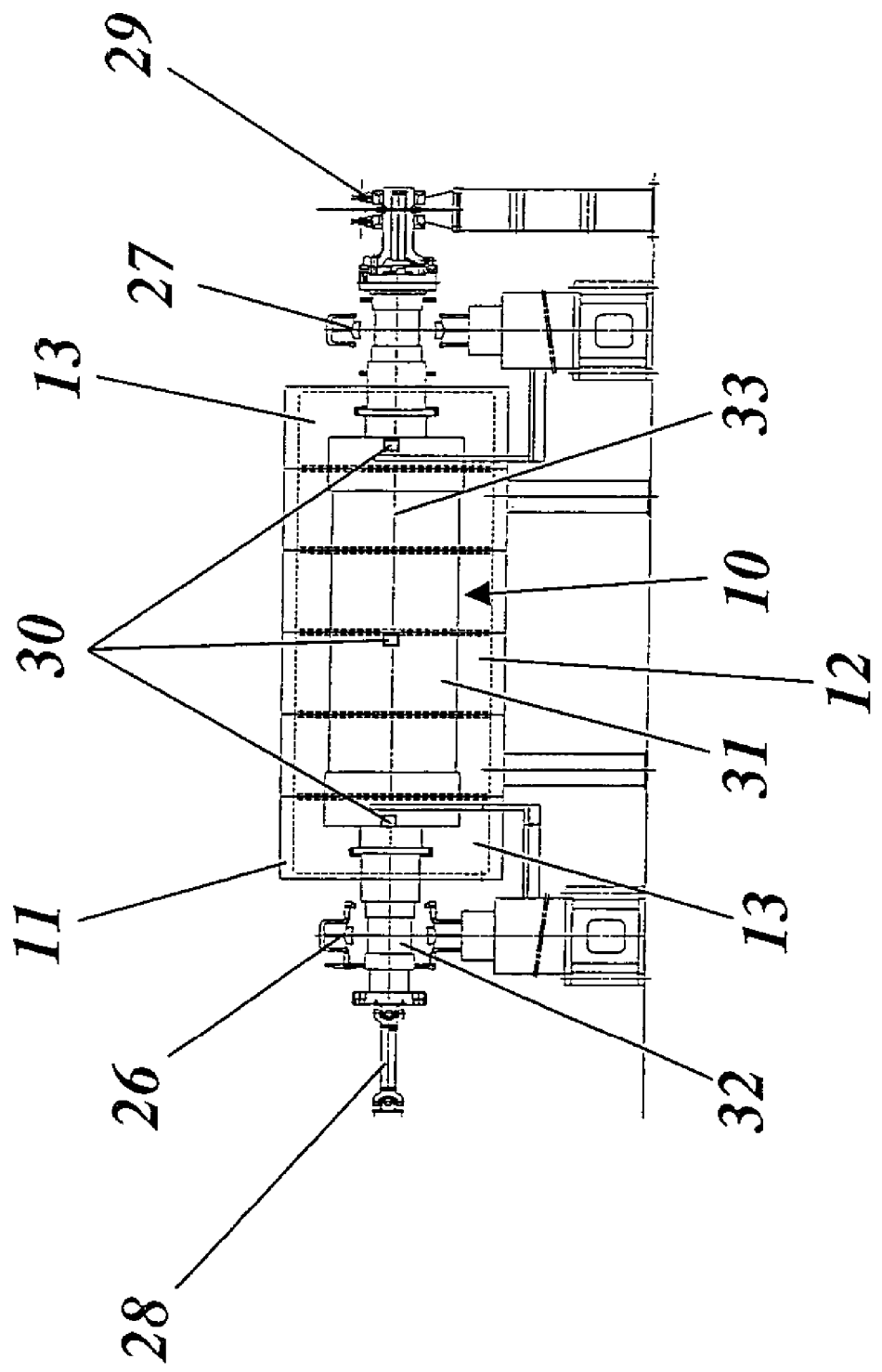
FIG. 2 shows a side view of the heating cell from FIG. 1 with a rotatably mounted rotor in a rotor test stand.

As can be seen in FIG. 2, the rotor 10 projects out of the heating cell 11 in the axial direction on both sides with the ends of the rotor shaft 32 and is mounted rotatably in corresponding bearings 26, 27. At one end (on the left in FIG. 2), the rotor shaft 32 is connected to a drive shaft 28 and is brought to nominal rotational speed by a drive (not illustrated) via the drift shaft 28. At the other end, the rotor shaft 32 has flanged on it an extension piece with sliprings 29, via which the mean winding temperature MWT of the rotor winding can be measured, for example, by means of temperature measurement sensors 30 attached to the rotor 10 in the middle and at the ends of the rotor barrel 31 or via the rotor winding 34 itself.

Figure 6:
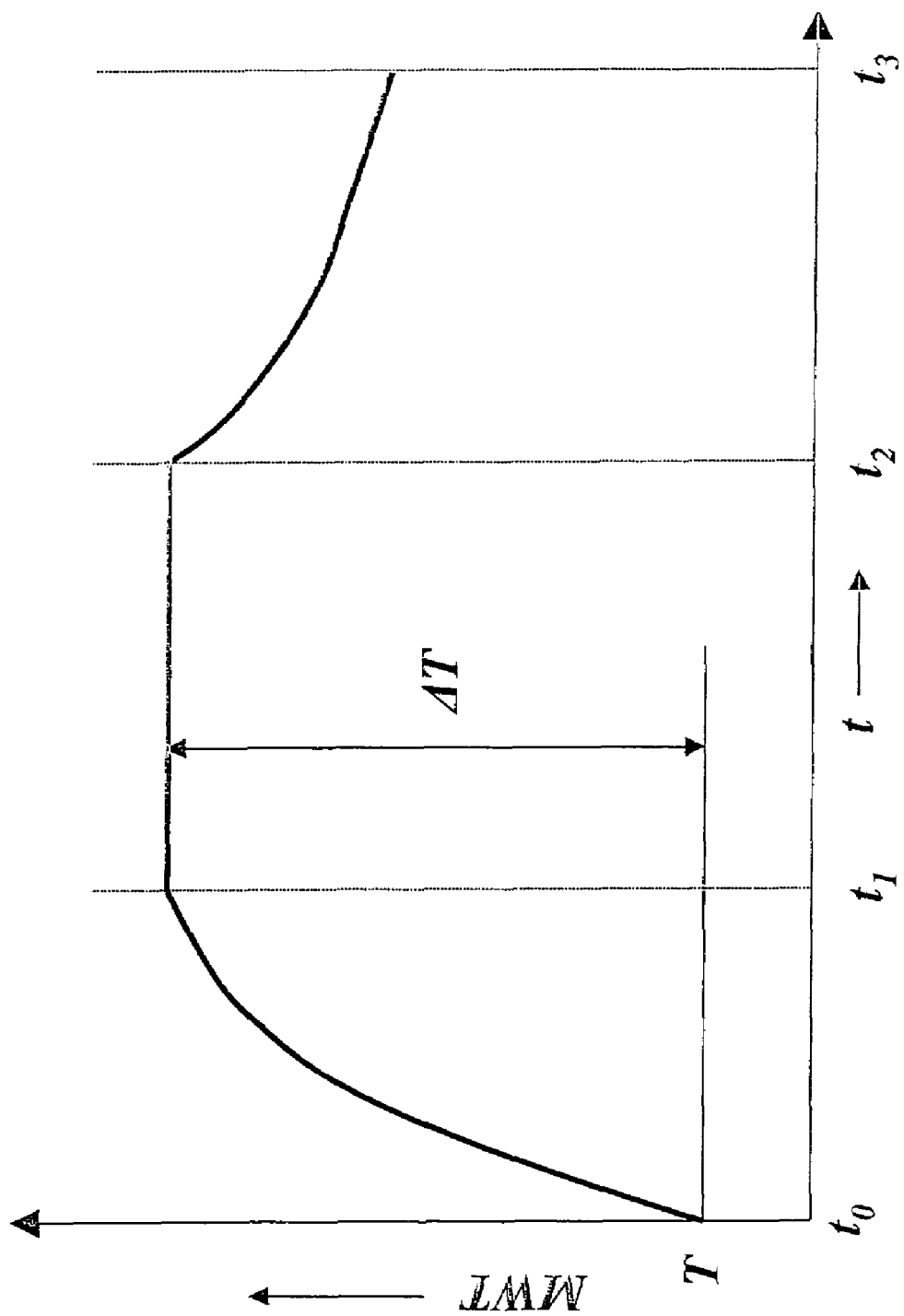
FIG. 6 shows an exemplary temperature profile, subdivided into three phases, during an oscillation test according to the invention.

According to FIG. 4, which relates to an exemplary axial cooling of the rotor winding, a temperature profile, illustrated in FIG. 6, of the mean winding temperature MWT over the time t is achieved by means of a suitable control of the cooling circuit. To control the cooling circuit, controllable valves 43 and 44 are provided in the inlet lines 39 and outlet lines 40 (lower half B of FIG. 4). The inlet lines 39 and outlet lines 40 are likewise connected to one another by means of a recirculation line 41 in which a controllable valve 42 is arranged (upper half A of FIG. 4). In a first time interval $(t_0-t_1)$, at the nominal rotational speed of the rotor 10, the rotor winding is heated from an initial temperature T to a higher temperature $T+\Delta T$. This heating is achieved in that, according to the lower half B of FIG. 4, the valves 43 and 44 are closed and the emerging cooling medium is recirculated completely or substantially to the entrance. The flow-dynamic losses arising from the interaction of the rotor with the cooling medium result, in the closed circuit, in an increasing heating of the cooling medium which is transmitted to the rotor winding 34. When the increased temperature $T+\Delta T$ is reached, in a second time interval $(t_1-t_2)$ the temperature reached is held constant, in that further heating is prevented by means of an increasing opening of the closed cooling circuit. In a third time interval $(t_2-t_3)$, the cooling medium is then cooled again from the higher temperature, in that, according to the upper half A of FIG. 4, the recirculation line 41 is closed by means of the valve 42 and the heat is discharged by means of the supply of cold cooling medium, at the same time with heated cooling medium being discharged from the rotor winding 34.

Figure 5:
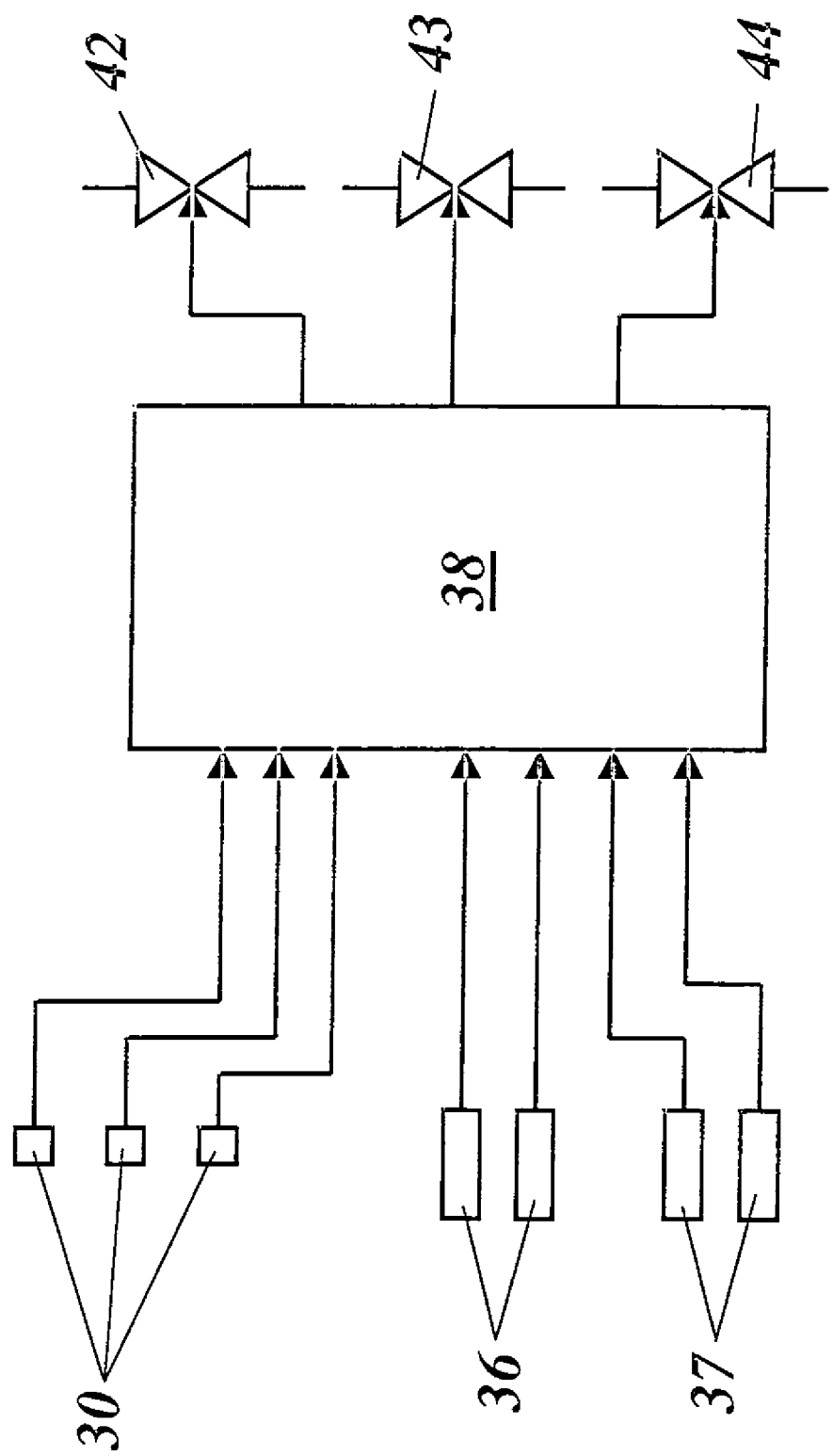
FIG. 5 shows a greatly simplified circuit diagram for controlling the valves from FIG. 4 as a function of the temperature on the rotor and for the measurement of the rotor oscillations by means of a central control and evaluation unit.

The control of the valves 42, . . . , 44 takes place, for example, according to FIG. 5, by means of a central control and evaluation unit 38, to which three temperature measurement sensors 30 arranged so as to be distributed on the rotor barrel 31 are connected on the entry side. The thermally induced oscillation variations in the rotor 10 which occur during the temperature profile from FIG. 6 are recorded by means of oscillation sensors 36 and 37 and are supplied to the control and evaluation unit 38 for evaluation. The oscillation sensors 36 and 37 are always provided in pairs for two orthogonal directions perpendicular to the rotor axis 33 and may be arranged on the bearings 26, 27 and/or at the ends of the rotor shaft 32.

Steps and conditions during a test run ("warm-up") in the heating cell 11 according to the invention include the following:

(1) the rotor 10 is set up in the centrifuge and is balanced according to the specifications.

(2) The rotor 10 has attached to it, for example, temperature measurement sensors 30 for determining the mean winding temperature MWT at nominal rotational speed (normally 1500 . . . 3600 rev/min.). Alternatively, the MWT may also be determined by means of the variation in electrical resistance of the rotor winding 34, as is known, for example, from the warm-up induced by exciting current or type running trials. The temperature measurement sensors 30 may also be used for determining the temperature of the cooling medium.

(3) The rotor is built around with a heating cell 11 which surrounds at least the cooling air inlets and outlets of the rotor 10:
   a. The cell must be well sealed off in order to avoid major leakages.
   b. The circulating volume of the cooling medium must be clearly delimited.
   c. The cell may have internal subdivisions into individual inlet and outlet chambers.
   d. The inlet and outlet of the cooling medium are controllable (valves).
   e. Heated cooling medium can be recirculated to the inlet in a controlled way (recirculation line).

(4) For the cooling phase, sufficiently cold cooling medium must be supplied and heated cooling medium must be discharged.

(5) The rotor is brought to nominal rotational speed and held at this.

(6) The rotor oscillation, the winding temperature and the temperatures of the cooling medium at the inlet and outlet and/or within the cell are measured and monitored.

(7) The cold air supply, hot air discharge and possible recirculation are controlled according to the winding temperature, the test stipulations and, if appropriate, the cooling air temperature. In this case, auxiliary devices, such as additional heating sources 25 (for example, heat exchangers, heating bodies, burners, etc.) or fans 46 may also be used, such as are indicated in FIG. 4 as blocks depicted by dashes.

What is claimed is:

1. A method for testing a thermally induced unbalance of a rotating machine part, the method comprising:
surrounding the rotating machine part at least partially by at least one closed heating cell;
circulating a cooling medium with respect to the rotating machine part in the heating cell;
bringing the rotating machine part balanced at normal temperature in a demounted state first to a nominal rotational speed and holding the rotating machine part at the nominal rotational speed;
varying the temperature of the rotating machine part, wherein the varying of the temperature takes place essentially due to flow-dynamic losses arising from an interaction of the rotating machine part with the circulating cooling medium; and
measuring transient variations in oscillations of the rotating machine part.

2. The method as recited in claim 1, wherein the rotating machine part is a rotor of a turbogenerator.

3. The method as recited in claim 1, wherein the varying of the temperature includes heating the rotating machine part to a first temperature in a first time interval, holding the rotating machine part at the first temperature in a second time interval, and cooling the rotating machine part from the first temperature in a third time interval.

4. The method as recited in claim 2, wherein the rotor has a rotor winding, and further comprising measuring a mean winding temperature of the rotor winding so as to determine a temperature of the rotor.

5. The method as recited in claim 4, wherein the rotor includes a rotor shaft and a rotor barrel formed in a middle part of the rotor shaft and containing the rotor winding, wherein the rotor barrel is surrounded by the heating cell, and wherein the rotor shaft is rotatably mounted on each of the two sides of the rotor barrel in a bearing disposed outside the heating cell.

6. The method as recited in claim 5, wherein the measuring of the mean winding temperature is performed by measuring a temperature at each end of the rotor barrel and in the middle of the rotor barrel.

7. The method as recited in claim 5, wherein circulating of the cooling medium includes flowing the cooling medium to enter the heating cell at the ends of the rotor barrel via an inlet line, flowing the cooling medium into the rotor winding axially on end faces of the rotor barrel, flowing the cooling medium out of the rotor winding radially on a circumference of the rotor barrel and flowing the cooling medium so as to emerge from the heating cell via an outlet line.

8. The method as recited in claim 7, wherein the varying of the temperature includes heating the rotating machine part to a first temperature in a first time interval, holding the rotating machine part at the first temperature in a second time interval, and cooling the rotating machine part from the first temperature in a third time interval, and wherein during the first time interval, the cooling medium emerging from the heating cell is recirculated at least partially from the outlet line to the inlet line for renewed entry into the heating cell.

9. The method as recited in claim 7, wherein during the third time interval, cold cooling medium is supplied to the heating cell and heated cooling medium is discharged from the heating cell.

10. The method as recited in claim 7, wherein the heating cell is subdivided inside in an axial direction into at least one outlet chamber for collecting the cooling medium flowing out of the rotor winding and at least one inlet chamber disposed adjacent to the outlet chamber and surrounding one of an end face of the rotor barrel and the inlet line, and wherein the cooling medium is supplied into the inlet chamber and is discharged from the outlet chamber.

11. The method as recited in claim 7, wherein the cooling medium flows through the rotor winding essentially in an axial direction.

12. The method as recited in claim 7, wherein the cooling medium flows through the rotor winding essentially in a radial direction.

13. The method as recited in claim 4, wherein the circulation of the cooling medium is controlled by means of valves, and wherein a profile of the mean winding temperature is influenced during the test by means of control of the valves.

14. The method as recited in one claim 4, wherein at least one additional heating source in the cooling media stream is used in order to regulate the cooling medium temperature.

15. The method as recited in claim 4, wherein the circulation of the cooling medium is influenced by means of at least one additional fan.

16. A device for testing a thermally induced unbalance of a rotating machine part, comprising:
   a mounting device configured to rotatably mount the rotating machine part;
   a driving device configured to drive the rotating machine part to the nominal rotational speed;
   a temperature measuring device configured to measure a temperature of the rotating machine part;
   an oscillation measuring device configured to measure oscillations of the rotating machine part; and
   at least one closed heating cell having an inlet side and an outlet side and at least partially surrounding the rotating machine part, wherein a cooling medium flows from the inlet side to the outlet side so as to cool the rotating machine part.

17. The device as recited in claim 16, wherein the rotating machine part is a rotor of a turbogenerator, the rotor including a rotor shaft and a rotor barrel formed in a middle part of the rotor shaft and containing a rotor winding, wherein the heating cell surrounds the rotor barrel, and further comprising bearings disposed on opposite sides outside the heating cell and configured to rotatably mount the rotor shaft.

18. The device as recited in claim 17, wherein the heating cell is subdivided inside in an axial direction into at least one outlet chamber for collecting the cooling medium flowing out of the rotor and at least one inlet chamber disposed adjacent to the outlet chamber and surrounding one of an end face of the rotor barrel and an inlet of the cooling medium into the rotor, and further comprising inlet lines for the cooling medium connected to the inlet chamber and outlet lines for the cooling medium connected to the outlet chamber.

19. The device as recited in claim 18, further comprising a recirculation line connecting the inlet lines and outlet lines and capable of being shut off.

20. The device as recited in claim 19, further comprising a controllable valve disposed in the recirculation line.

21. The device as recited in claim 19, further comprising a controllable valve disposed in each of the inlet lines upstream from the recirculation line and in each of the outlet lines downstream of the recirculation line.

22. The device as recited in claim 20, further comprising a control and evaluation unit controlling the controllable valve according to a measured temperature in the rotor.

23. The device as recited in claim 18, further comprising at least one additional heating source disposed in the flow of the cooling medium.

24. The device as recited in claims 18, further comprising at least one additional fan for assisting the flow of the cooling medium.

25. The device as recited in claim 21, further comprising a control and evaluation unit controlling each of the controllable valves according to a measured temperature in the rotor.

* * * * *